United States Patent
Madej et al.

(10) Patent No.: US 9,495,564 B2
(45) Date of Patent: *Nov. 15, 2016

(54) ARRANGEMENT FOR AND METHOD OF ASSESSING A CAUSE OF POOR ELECTRO-OPTICAL READING PERFORMANCE BY DISPLAYING AN IMAGE OF A SYMBOL THAT WAS POORLY READ

(71) Applicant: SYMBOL TECHNOLOGIES, INC., Lincolnshire, IL (US)

(72) Inventors: Dariusz Madej, Shoreham, NY (US); Kenneth S. Bhella, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,590

(22) Filed: Apr. 6, 2015

(65) Prior Publication Data

US 2016/0292468 A1 Oct. 6, 2016

(51) Int. Cl.
*G06K 7/00* (2006.01)
*G06K 7/14* (2006.01)
*G06K 7/10* (2006.01)

(52) U.S. Cl.
CPC .......... *G06K 7/0095* (2013.01); *G06K 7/1465* (2013.01); *G06K 7/10821* (2013.01); *G06K 7/1417* (2013.01)

(58) Field of Classification Search
CPC ............... G06K 7/10722; G06K 7/10851; G06K 19/14
See application file for complete search history.

(56) References Cited

U.S. PATENT DOCUMENTS

| | | | |
|---|---|---|---|
| 6,123,261 A * | 9/2000 | Roustaei | G02B 26/101 235/462.01 |
| 8,579,198 B2 | 11/2013 | Madej et al. | |
| 8,678,274 B1 | 3/2014 | Madej | |
| 2004/0118928 A1* | 6/2004 | Patel | G06K 7/0004 235/472.01 |
| 2005/0274806 A1 | 12/2005 | Dant | |
| 2006/0011724 A1* | 1/2006 | Joseph | G06K 7/10722 235/454 |
| 2007/0119941 A1 | 5/2007 | He | |
| 2009/0188981 A1* | 7/2009 | Iizaka | G06Q 20/204 235/462.41 |
| 2011/0049242 A1* | 3/2011 | Vinogradov | G06K 7/10722 235/462.42 |
| 2012/0097745 A1 | 4/2012 | Brock | |
| 2013/0062413 A1* | 3/2013 | Nahill | G06K 7/10198 235/462.25 |
| 2014/0263644 A1 | 9/2014 | Handshaw et al. | |

OTHER PUBLICATIONS

International Search Report and Written Opinion from corresponding International Patent Application No. PCT/US2016/023758 mailed Jun. 6, 2016.

* cited by examiner

*Primary Examiner* — Christopher Stanford

(57) ABSTRACT

A reader electro-optically reads symbols by image capture to obtain read data, and a controller processes symbol images of the symbols captured by the reader, and decodes the read data to obtain symbol data indicative of the associated products. The controller also collects time-to-decode metadata by determining the decode time periods that are taken for the symbol data to be successfully decoded, associates the decode time periods with the symbol images, stores the longest decode time period and its associated symbol image, and displays the stored symbol image associated with the stored longest decode time period to determine a cause of the reading performance of the reader.

16 Claims, 4 Drawing Sheets

HOST SERVER

| SYMBOLOGY | LONGEST DECODE TIME (ms) | SYMBOL (PRODUCT) | IMAGE |
|---|---|---|---|
| UPC | 3500 | 1234567890 | IMAGE 1 |
| DATABAR | 4000 | 1234567890 | IMAGE 2 |
| QR | 4500 | 0987654321 | IMAGE 3 |

ARRANGEMENT FOR AND METHOD OF ASSESSING A CAUSE OF POOR ELECTRO-OPTICAL READING PERFORMANCE BY DISPLAYING AN IMAGE OF A SYMBOL THAT WAS POORLY READ

BACKGROUND OF THE INVENTION

The present disclosure relates generally to an arrangement for, and a method of, assessing reading performance during reading of coded symbols to be electro-optically decoded and read by image capture, and, more particularly, to displaying a symbol image of the symbol that took the longest decode time period to be successfully decoded, thereby enabling a cause of the slow, sluggish reading performance to be determined.

Handheld readers and hands-free readers, such as flat bed or horizontal slot readers, vertical slot readers, and bi-optical readers, have all been used to electro-optically read targets, such as one-dimensional bar code symbols, particularly of the Universal Product Code (UPC) type, and two-dimensional bar code symbols, such as PDF417 and QR codes, in many different venues, such as at full-service or self-service, point-of-transaction, retail checkout systems operated by checkout clerks or customers, and located at supermarkets, warehouse clubs, department stores, and other kinds of retailers, as well as at many other types of businesses, for many years. Handheld readers are typically held in a user's hand and aimed at products bearing, or associated with, identifying target symbols. For hands-free readers having a scan window, such products with their target symbols are typically slid by a user across the scan window in a "swipe" mode, or the user merely presents the target symbols momentarily steady at the scan window in a "presentation" mode. The choice depends on the type of target, on user preference, and on the layout of the system.

Imager-based readers have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a scan window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into target data related to the target being electro-optically read, e.g., decoded data identifying the product, and enabling information, such as the product's price, to be retrieved from a price database, or into a picture of a target other than a symbol.

The above-described imager-based readers, employed in either handheld and/or hands-free modes of operation, typically decode and read a symbol in an optimum decode time, e.g., less than about 200 milliseconds (ms), and this is generally considered to be responsive, aggressive, and satisfactory in most applications. Upon a successful decode, the controller typically energizes an auditory annunciator, e.g., a beeper, and/or a visual indicator, such as a light, to alert the user that the target has been successfully decoded. There are times, however, when such decode times are not routinely realized. For example, a symbol may be poorly printed, or covered up with extraneous markings or dirt. Or, a label bearing the symbol may be torn, or overlain with a transparent plastic film or dirt, or placed incorrectly on its product. Alternatively, sunlight or ambient bright lights may cause specular reflections or bright spots to appear on the symbol. The scan window itself may be dirty or scratched, which may interfere with a quick, responsive reading. An inexperienced user may be performing an incorrect scanning technique, thereby delaying reading. All of these factors, and more, either singly or in combination, can deleteriously impair reading performance and can slow down the decode time to exceed the optimum decode time of about 200 ms, and, in some cases, to exceed about 3 seconds, thereby causing the reader to time out without having read the symbol. Such a slow, sluggish performance is unacceptable, particularly in the retail industry, where retailers value fast checkout transactions, and where getting a customer checked out faster generally results in higher revenues.

At present, some retailers try to discover any symbols that read poorly (slowly) by instructing their clerks to take note of each such sluggish performance. Typically, this is done by manually collecting a second physical specimen of the product with the symbol that scanned slowly, because the first physical specimen of the product has already been purchased and removed from the retailer's premises by the customer. In this way, the retailers can inspect the second physical specimen and possibly determine, for example, the source of the slow decode time and possibly see if there is any consistent pattern to the poor performance. However, this technique is ineffective in practice. A clerk may either conveniently or inadvertently forget the retailer's instructions, or simply not wish to be bothered to retrieve a second physical specimen. Not every clerk will have the same mental determination as to what amount of decode time is slow or fast. Due to the subjective, labor-intensive, and extra cost and effort associated with this technique, most retailers do not optimize their checkout times at all, or not as regularly or frequently as they would like.

Accordingly, there is a need to assess reading performance in an automatic, accurate, and inexpensive manner, and to readily determine the cause of poor (slow) reading performance so that corrective measures can be quickly implemented.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
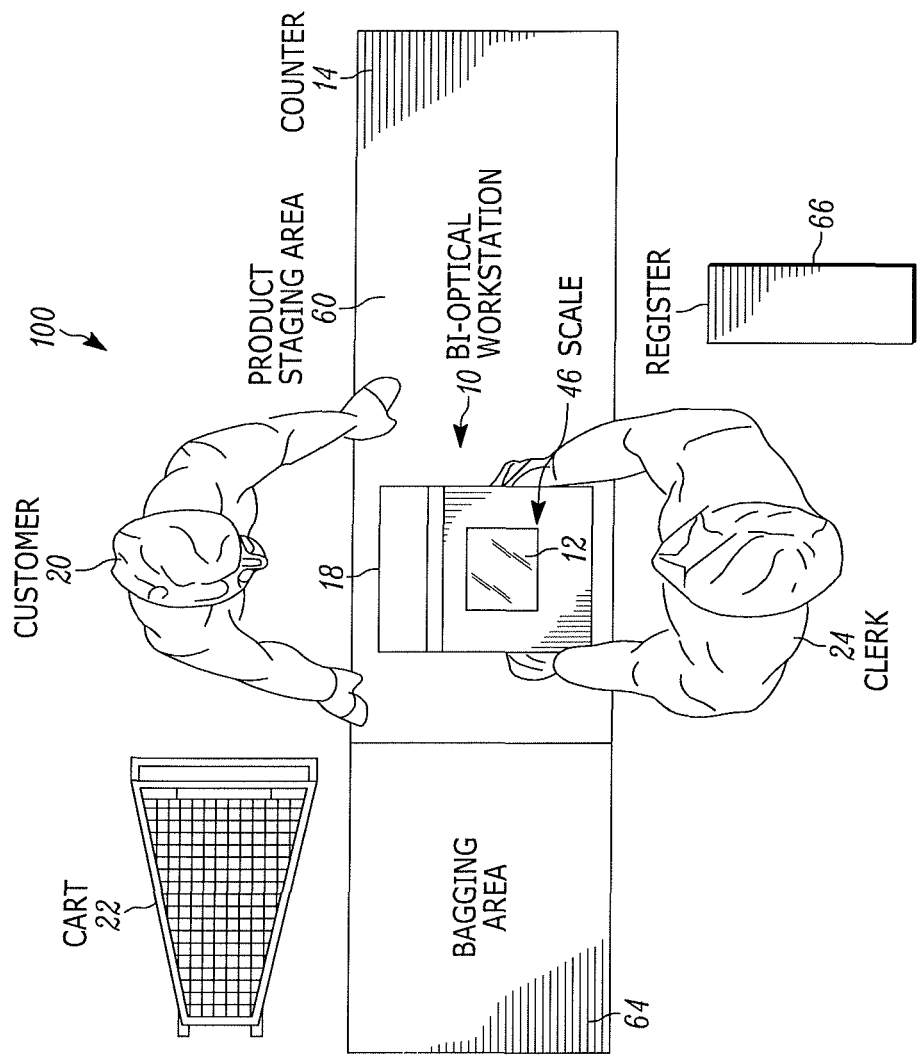
FIG. 1 is a top plan view of a retail checkout system in which reading performance is assessed in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for assessing reading performance during reading of coded symbols associated with products. The arrangement includes a reader, e.g., an imager-based reader, for electro-optically reading the symbols by image capture to obtain read data, and a controller, e.g., a programmed microprocessor, for processing symbol images of the symbols captured by the reader, and for decoding the read data to obtain symbol data indicative of the associated products. The controller also collects time-to-decode metadata by determining the decode time periods that are taken for the symbol data to be successfully decoded, associates the decode time periods with the symbol images, stores the longest decode time period and its associated symbol image, and displays the stored symbol image associated with the stored longest decode time period to determine a cause of the reading performance.

Preferably, the controller recognizes and classifies the symbols into different symbologies, and stores the longest decode time period and its associated symbol image for each symbology, and displays the stored symbol image associated with the stored longest decode time period for each symbology.

A method of assessing reading performance during reading of coded symbols associated with products, in accordance with another aspect of this disclosure, is performed by electro-optically reading the symbols by image capture to obtain read data, processing symbol images of the symbols captured by the reader, decoding the read data to obtain symbol data indicative of the associated products, collecting time-to-decode metadata by determining the decode time periods that are taken for the symbol data to be successfully decoded, associating the decode time periods with the symbol images, storing the longest decode time period and its associated symbol image, and displaying the stored symbol image associated with the stored longest decode time period to determine a cause of the reading performance.

Figure 2:
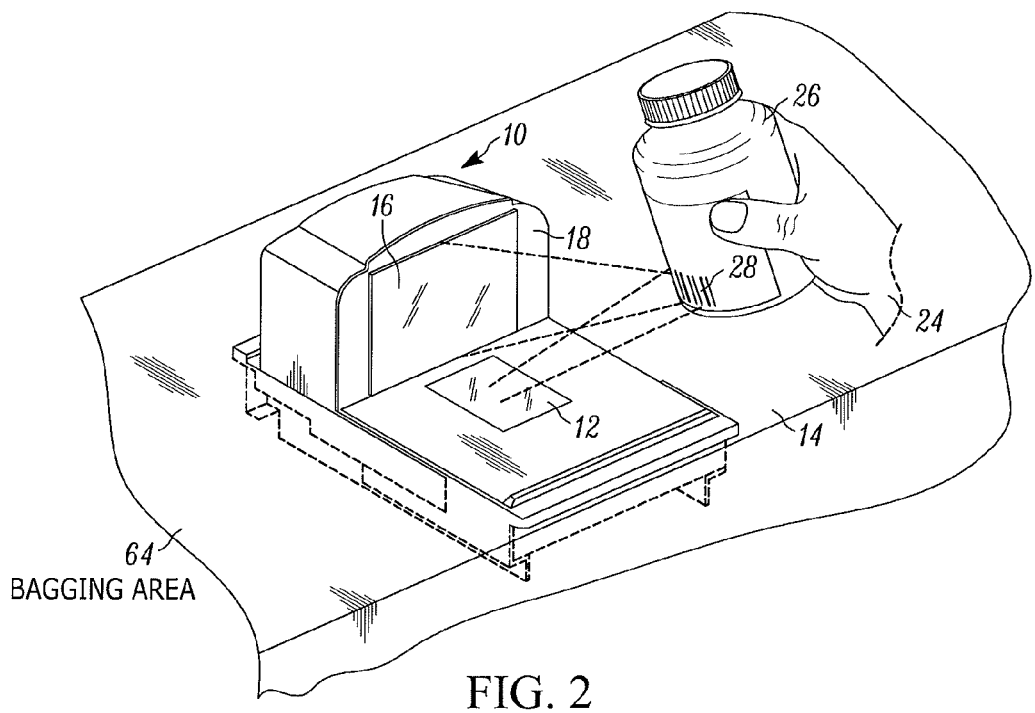
FIG. 2 is a broken-away perspective view of the system of FIG. 1 during reading.
Figure 3:
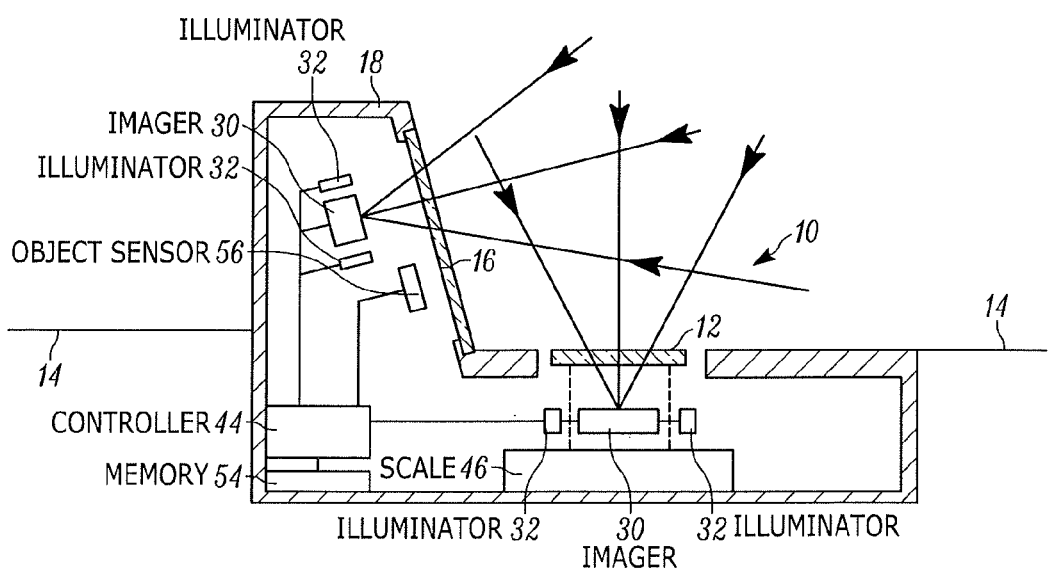
FIG. 3 is a schematic diagram of various components of the system of FIG. 1.

Turning now to the drawings, a retail checkout system 100, as depicted in FIG. 1, includes a reader and, as shown, a dual window, bi-optical, point-of-transaction workstation 10 used by retailers at a checkout counter in an aisle to process transactions involving the purchase of products 26 (see FIG. 2) bearing an identifying target, such as the UPC symbol 28 described above. In a typical retail venue, a plurality of such workstations 10 is arranged in a plurality of checkout aisles. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or preferably, as shown in FIGS. 2-3, rests in a cutout or well formed in the counter.

Both of the windows 12, 16 are positioned to face and be accessible to a clerk 24 (FIG. 1) standing at one side of the counter for enabling the clerk 24 to interact with the workstation 10, and with a cash register 66 to enable the clerk to receive payment for the purchased products. The register 66 may include a debit/credit card reader and a receipt printer to print a receipt. The workstation 10 and/or the register 66 is in wired or wireless communication with a host server 70, as described below in connection with FIG. 4. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As schematically shown in FIG. 3, a data capture arrangement, advantageously including a plurality of imaging readers, each including a solid-state imager 30 and an illuminator 32, is mounted at the workstation 10, for capturing light passing through either or both windows 12, 16 from a target that can be a one- or two-dimensional symbol. Each imager 30 is a solid-state area array, preferably a CCD or CMOS array. Each imager 30 preferably has a global shutter. Each illuminator 32 is preferably one or more light sources, e.g., one or more surface-mounted, light emitting diodes (LEDs), located at each imager 30 to uniformly illuminate the symbol.

In use, the clerk 24 processes each product 26 bearing a UPC symbol 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The symbol 28 may be located on any of the top, bottom, right, left, front and rear, sides of the product, and at least one, if not more, of the imagers 30 will capture the illumination light reflected, scattered, or otherwise returning from the symbol through one or both windows as an image.

FIG. 3 also schematically depicts that a weighing scale 46 can be mounted at the workstation 10. Also, an object sensor 56 is mounted at the workstation 10 for detecting when each product 26 enters the workstation 10. The object sensor 56 may advantageously include at least one pair of an infrared (IR) light emitting diode (LED) emitter and an IR detector. The imagers 30, the associated illuminators 32, and the object sensor 56 are operatively connected to a programmed workstation microprocessor or controller 44 operative for controlling the operation of these and other components. Preferably, the controller 44 is tasked with processing the return light scattered from each symbol 28, with processing an image of each symbol 28, and with decoding the captured symbol image of the return light to generate symbol data. A memory 54 is operatively bidirectionally connected to the controller 44. The memory 54 can be internal or external to the controller 44.

In operation, an active mode for the controller 44 is initiated when the object sensor 56 detects that a product 26 has entered the workstation 10. The controller 44 then sends successive command signals to the illuminators 32 to pulse the LEDs for a short time period of about 200 microseconds or less, and successively energizes the imagers 30 to collect light from the symbol 28 only during said time period, also known as the exposure time period. By acquiring a symbol image during this brief time period, the image of the symbol 28 is not excessively blurred even in the presence of relative motion between the imagers and the symbol. A typical array needs about 11 to 33 milliseconds to acquire the entire symbol image and operates at a frame rate of about 30 to 90 frames per second. The array may have on the order of one million addressable sensors. The active mode ends when the object sensor 56 detects that the product 26 has exited the workstation 10, or when the controller 44 has successfully decoded the symbol 28 and identified the product 26. Upon a successful decode, the controller 44 typically energizes an auditory annunciator, e.g., a beeper, and/or a visual indicator, such as a light, to alert the clerk 24 that the symbol 28 has been successfully decoded.

Although an imager-based bi-optical workstation 10 having dual windows has been illustrated in FIGS. 1-3, it will be expressly understood that the present disclosure is not intended to be so limited, because a flat bed or horizontal slot reader having a single horizontal window, or a vertical slot reader having a single vertical window, could be employed instead of the bi-optical workstation 10. Also, trigger-operated handheld readers, typically gun-shaped in configuration, could replace the illustrated workstation 10.

Thus, no matter which type of reader is employed, the controller 44 not only processes each captured symbol image, and decodes and generates the symbol data indicative of the associated products 26 involved in the transactions occurring at the reader, as described above, but also is additionally tasked with collecting "time-to-decode" metadata, which is additional or auxiliary data descriptive of the duration of each decode time period that is taken for each symbol data to be successfully decoded.

The controller 44 associates each decode time period with a symbol image, stores the longest decode time period and its associated symbol image, and displays the stored symbol image associated with the stored longest decode time period to determine a cause of the reading performance. In the preferred embodiment in which the time-to-decode metadata is collected substantially simultaneously with the generation of the symbol data, the controller 44 determines each decode time period by determining a start time when reading is initiated, and an end time when reading is completed upon a successful decode. The difference between the end and the start times is a measure of the decode time period. In the case of the hands-free workstation 10, the start time begins when the object sensor 56 detects entry of the product 26 into the workstation. In the case of the handheld reader, the start time begins when its trigger is manually actuated or depressed. In either case, the end time is determined when the controller 44 generates a successful decode signal to energize the aforementioned annunciator/light. The controller 44 will automatically refresh the stored longest decode time period if a new symbol takes even longer to decode than a previous symbol.

As noted above, one aspect of this disclosure is to assess the cause of a poor, slow reading performance, e.g., a decode time period exceeding an optimum decode time of about 200 ms, and, in some cases, exceeding about 3 seconds, in an automatic, accurate, and inexpensive manner, so that corrective measures can be quickly implemented. To that end, the controller 44 automatically stores in the memory 54 the longest, slowest, worst, decode time period and its associated symbol image, as well as its associated symbol data. The identity of the symbol (product) that caused the slowest decode time period is determined by consulting the symbol image and/or the symbol data. The memory 54 can be queried by the host server 70 (FIG. 4) and can be displayed on a monitor screen 72. A retailer can then refer to the displayed query results as often as desired, e.g., daily, to determine which symbol (product) was the worst offender in slowing down the checkout process. In another embodiment, if the memory 54 has sufficient storage capacity, rather than storing a single decode time period representative of the longest decode time period, the controller 44 can be programmed to store a plurality of decode time periods, together with their associated symbol data and their associated symbol images, that are representative of the longest decode time periods that exceed a predetermined time period.

Figure 4:
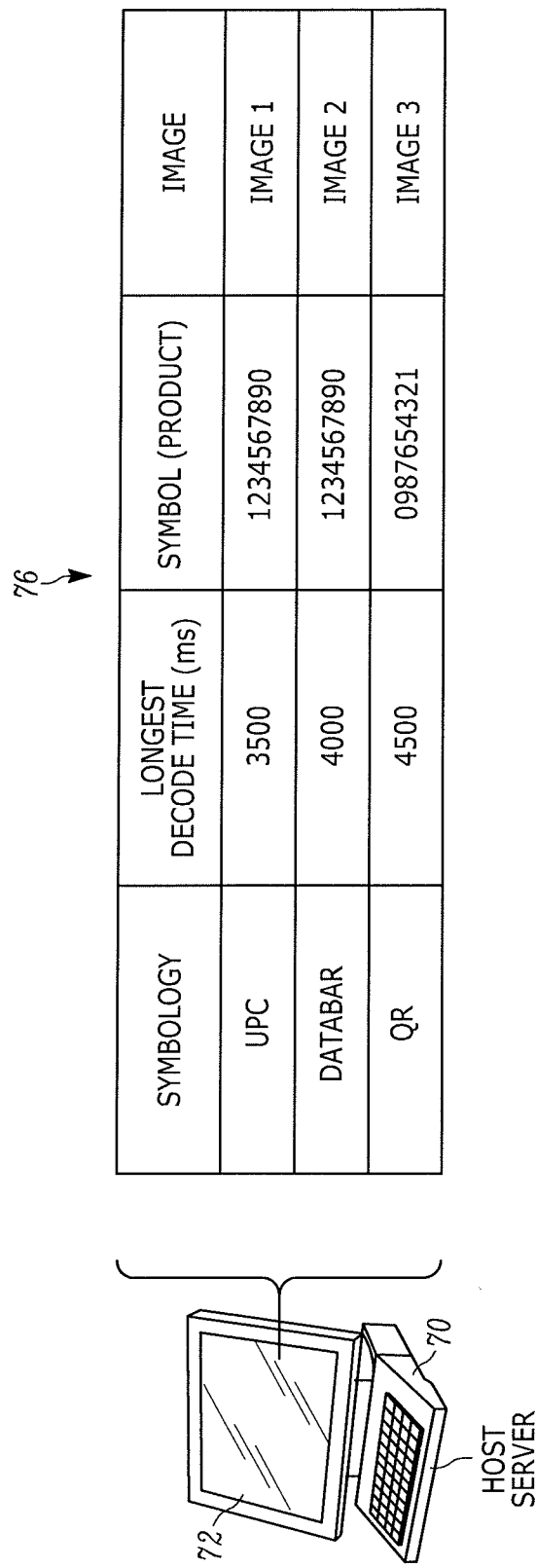
FIG. 4 is a diagrammatic view of a host server querying the system and displaying images of symbols of different symbologies that each took the longest time period to be successfully decoded.

As diagrammatically illustrated in FIG. 4 by the chart 76, the controller 44 advantageously first recognizes and classifies which symbology is being read. Symbols can be categorized in many different symbologies or families, and different symbologies take different amounts of time to be decoded. For example, two-dimensional symbols take almost twice as long to be decoded than one-dimensional symbols. Thus, one-dimensional UPC codes (UPCA, UPCE, EAN8, EAN13, Supplementals, etc.) could be arranged in one family; all other one-dimensional, linear codes (C39, C128, ITF, etc.) could be arranged in another family; the DataBar codes could be arranged in still another family; the PDF/uPDF codes could be arranged in still another family; and the two-dimensional matrix codes (QR, Data Matrix, Aztec, etc.) could be arranged in still a further family. Each family is recognized and classified by the controller 44 and is provided with its own individual row in the memory 54 to store the slowest decode time period for each symbology, as well as the symbol image and/or the symbol data (product) that caused the slowest decode time period for each symbology.

Thus, as shown in the chart 76 in FIG. 4, the longest decode time period for the UPC symbology is stored together with its symbol data and its symbol image (Image 1); the longest decode time period for the Databar symbology is stored together with its symbol data and its symbol image (Image 2); and the longest decode time period for the QR symbology is stored together with its symbol data and its symbol image (Image 3). The chart 76 is merely exemplary, because a different number of rows, and different symbologies could have been illustrated. As noted above, each of these decode time periods can be automatically refreshed and, if sufficient storage capacity exists in the memory 54, then it is also envisioned that a plurality of the longest decode time periods for each symbology, together with their associated symbol data and their associated symbol images, could be provided.

By inspection of each symbol image, the quality of the symbol, the position of the symbol, and the reading environment itself can be assessed. For example, the image inspection might reveal that the symbol was poorly printed, or covered up with extraneous markings or dirt. Or, the image inspection might reveal that a label bearing the symbol was torn, or overlain with a transparent plastic film or dirt, or was placed incorrectly on its product. Alternatively, the image inspection might reveal that sunlight or ambient bright lights caused specular reflections or bright spots to appear on the symbol. All of these factors, and more, either singly or in combination, can deleteriously impair reading performance and can slow down the decode time to exceed the optimum decode time of about 200 ms.

The stored symbol image is preferably "cleaned up" by the controller 44 prior to its being stored. For example, in the bi-optical workstation 10, an image of the symbol is typically captured not as a single image in a single frame, but as a plurality of sub-images in a plurality of frames over a plurality of fields of view, and the controller 44 processes the symbol image by combining and formatting the sub-images. The controller 44 also typically stitches the sub-images together, removes any specular reflections, crops the stitched-together image, and formats the image.

Figure 5:
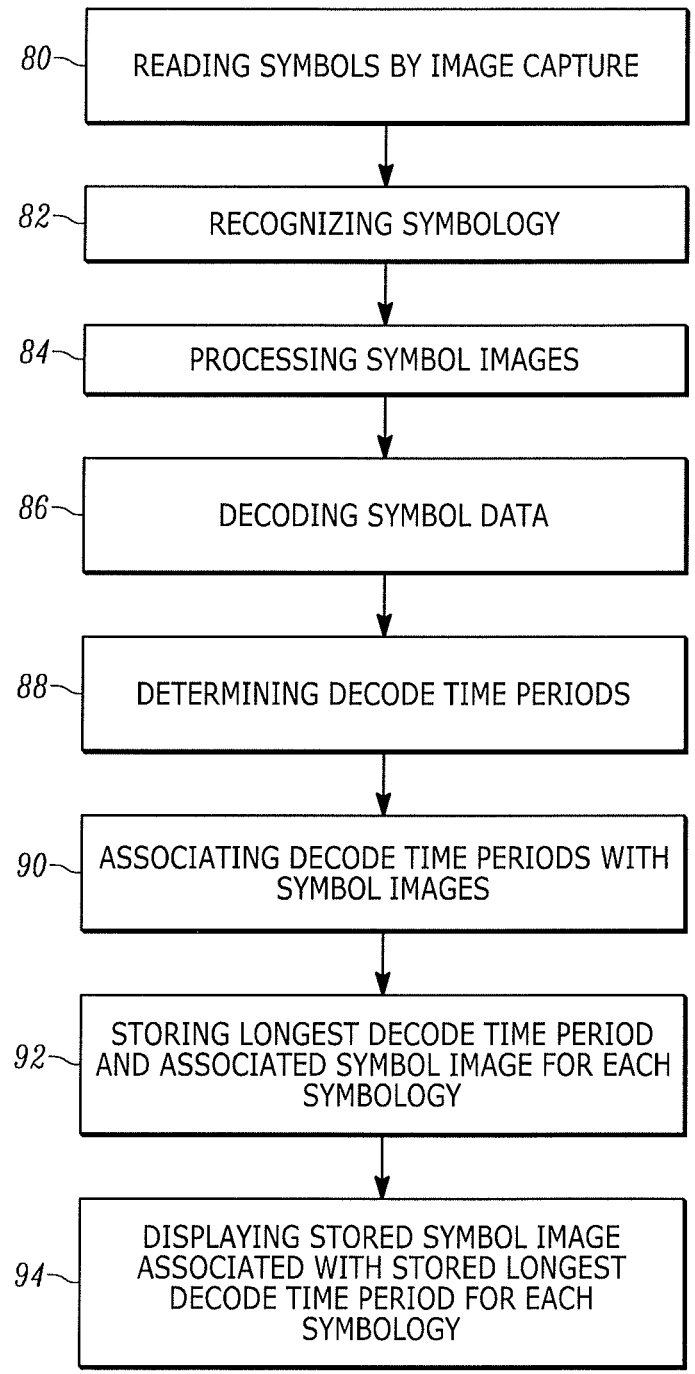
FIG. 5 is a flow chart depicting the steps performed in assessing reading performance in accordance with this disclosure.

As shown in the flow chart of FIG. 5, the method of assessing reading performance during reading of coded symbols 28 associated with products 26, is performed by electro-optically reading the symbols by image capture to obtain read data (step 80), optionally recognizing the symbology of the symbols (step 82), processing symbol images of the symbols captured by the reader (step 84), decoding the read data to obtain symbol data indicative of the associated products (step 86), collecting time-to-decode metadata by determining the decode time periods that are taken for the symbol data to be successfully decoded (step 88), associating the decode time periods with the symbol images (step 90), storing the longest decode time period and its associated symbol image for each symbology (step 92), and displaying the stored symbol image associated with the stored longest decode time period (step 94), to determine a cause of the reading performance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for assessing reading performance during reading of coded symbols associated with products, comprising:
   a reader for electro-optically reading the symbols by image capture to obtain read data; and
   a controller for processing symbol images of the symbols captured by the reader, for decoding the read data to obtain symbol data indicative of the associated products, for collecting time-to-decode metadata by determining the decode time periods that are taken for the symbol data to be successfully decoded, for associating the decode time periods with the symbol images, for storing the longest decode time period and its associated symbol image, and for displaying the stored symbol image associated with the stored longest decode time period to determine a cause of the reading performance.

2. The arrangement of claim 1, wherein the controller is operative for determining each decode time period by determining a start time when reading is initiated, and an end time when reading is completed upon a successful decode.

3. The arrangement of claim 1, wherein the controller is also operative for associating the symbol data with the decode time periods and the symbol images, for storing the symbol data with the longest decode time period and its associated symbol image, and for displaying the stored symbol data with the stored symbol image and the stored longest decode time period.

4. The arrangement of claim 1, wherein the controller is operative for recognizing and classifying the symbols into different symbologies, for storing the longest decode time period and its associated symbol image for each symbology, and for displaying the stored symbol image associated with the stored longest decode time period for each symbology.

5. The arrangement of claim 1, and a host server for querying the controller to retrieve the stored symbol image associated with the stored longest decode time period.

6. The arrangement of claim 1, wherein the reader captures an individual symbol image as a plurality of sub-images over a plurality of fields of view, and wherein the controller is operative for processing the symbol images by combining and formatting the sub-images.

7. The arrangement of claim 1, wherein the controller is operative for automatically refreshing the longest decode time period.

8. The arrangement of claim 1, wherein the reader is a bi-optical reader having dual windows through which the symbol images are captured.

9. A method of assessing reading performance during reading of coded symbols associated with products, comprising:
   electro-optically reading the symbols by image capture to obtain read data;
   processing symbol images of the symbols captured by the reader;
   decoding the read data to obtain symbol data indicative of the associated products;
   collecting time-to-decode metadata by determining the decode time periods that are taken for the symbol data to be successfully decoded;
   associating the decode time periods with the symbol images;
   storing the longest decode time period and its associated symbol image; and
   displaying the stored symbol image associated with the stored longest decode time period to determine a cause of the reading performance.

10. The method of claim 9, wherein the determining of each decode time period is performed by determining a start time when reading is initiated, and an end time when reading is completed upon a successful decode.

11. The method of claim 9, and also associating the symbol data with the decode time periods and the symbol images, and also storing the symbol data with the longest decode time period and its associated symbol image, and also displaying the stored symbol data with the stored symbol image and the stored longest decode time period.

12. The method of claim 9, and recognizing and classifying the symbols into different symbologies, and storing the longest decode time period and its associated symbol image for each symbology, and displaying the stored symbol image associated with the stored longest decode time period for each symbology.

13. The method of claim 9, and retrieving the stored symbol image associated with the stored longest decode time period.

14. The method of claim 9, wherein the reading is performed by capturing an individual symbol image as a plurality of sub-images over a plurality of fields of view, and wherein the processing of the symbol images is performed by combining and formatting the sub-images.

15. The method of claim 9, and automatically refreshing the longest decode time period.

16. The method of claim 9, wherein the reading is performed by capturing the symbol images through dual windows of a bi-optical reader.

* * * * *